US008373746B2

(12) United States Patent
Smith

(10) Patent No.: US 8,373,746 B2
(45) Date of Patent: Feb. 12, 2013

(54) SURROUND VISION

(75) Inventor: Paul Smith, Durham (GB)

(73) Assignee: TV Sports Network Limited, Durham (GB)

( * ) Notice: Subject to any disclaimer, the term of this patent is extended or adjusted under 35 U.S.C. 154(b) by 1431 days.

(21) Appl. No.: 11/791,410

(22) PCT Filed: Nov. 28, 2005

(86) PCT No.: PCT/GB2005/004543
§ 371 (c)(1),
(2), (4) Date: May 23, 2007

(87) PCT Pub. No.: WO2006/056797
PCT Pub. Date: Jun. 1, 2006

(65) Prior Publication Data

US 2008/0043097 A1 Feb. 21, 2008

(30) Foreign Application Priority Data

Nov. 26, 2004 (GB) .................................. 0425987.5

(51) Int. Cl.
*H04N 13/04* (2006.01)

(52) U.S. Cl. ............................... 348/51; 348/40; 348/42

(58) Field of Classification Search .................... 348/40, 348/42, 51
See application file for complete search history.

(56) References Cited

U.S. PATENT DOCUMENTS

| | | | | |
|---|---|---|---|---|
| 4,473,355 | A | 9/1984 | Pongratz | |
| 4,656,506 | A | 4/1987 | Ritchey | |
| 5,130,794 | A | 7/1992 | Ritchey | |
| 5,179,440 | A | 1/1993 | Loban et al. | |
| 5,253,049 | A | 10/1993 | Brooke | |
| 6,448,965 | B1 * | 9/2002 | Wegman | 345/419 |
| 6,848,219 | B2 * | 2/2005 | Standard et al. | 52/6 |
| 7,123,211 | B2 * | 10/2006 | Nowatzyk | 345/1.1 |
| 7,197,851 | B1 * | 4/2007 | Jouppi et al. | 52/36.1 |
| 2004/0146540 | A1 * | 7/2004 | Ueda et al. | 424/401 |
| 2004/0239890 | A1 | 12/2004 | Starkweather | |
| 2005/0272011 | A1 * | 12/2005 | Herman et al. | 434/11 |
| 2006/0048092 | A1 * | 3/2006 | Kirkley et al. | 717/100 |
| 2006/0073449 | A1 * | 4/2006 | Kumar et al. | 434/219 |

FOREIGN PATENT DOCUMENTS

| | | |
|---|---|---|
| GB | 2 346 981 | 8/2000 |
| WO | 02/058806 | 8/2002 |

* cited by examiner

*Primary Examiner* — Lashonda Jacobs
(74) *Attorney, Agent, or Firm* — MacMillan, Sobanski & Todd, LLC

(57) ABSTRACT

A surround vision apparatus comprises at least one screen, at least one loud speaker, a plurality of projectors and a processor, wherein the at least one screen substantially encloses a space, and wherein the plurality of projectors project images onto the said at least one screen such that the said images may be viewed from within the said enclosed space, and wherein the processor synchronizes the projection of images onto the or each screen such that the images are perceived by the viewer as being uninterrupted.

17 Claims, 5 Drawing Sheets

SURROUND VISION

This application is the National Phase of International Application PCT/GB2005/004543 filed Nov. 28, 2005, which designated the U.S. That International Application was published in English under PCT Article 21(2) on Jun. 1, 2006 as International Publication Number WO 2006/056797A1. PCT/GB2005/004543 claims priority to U.K. Application No. 0425987.5, filed Nov. 26, 2004. Thus, the subject non-provisional application claims priority to U.K. Application No. 0425987.5, filed Nov. 26, 2004. The disclosures of both applications are incorporated herein by reference.

FIELD OF THE INVENTION

The invention relates to surround vision, and in particular to the delivery of images reflecting reality.

BACKGROUND OF THE INVENTION

The projection of images in a manner that allows an individual to visualize the information in those images as three dimensional has been known for some years. A common term used to describe such systems is virtual reality. In some systems, an image is projected onto a single flat screen, and viewers wear specially designed spectacles that allow them to view in three dimensions.

In other known systems, images are projected onto a plurality of screens, the screens being arranged to provide a number of walls of a box. One problem associated with these devices is that images tend to become distorted at corners.

It would be desirable to provide an improved apparatus for surround vision.

SUMMARY OF THE INVENTION

According to one aspect of the invention, there is provided an apparatus as specified in Claim 1.

By displaying images onto screens using the apparatus of the invention a person in the enclosure so that he perceives that he is viewing a 3-dimensional scene and feels as though he is immersed in the environment portrayed by the images on the screens. This is achieved by the matching of images to the screens such that edge effects leading to image distortion occur at the corners are minimised, and by the synchronisation of sound with image projection. The individual's experience is further enhanced by the ability to feed live imagery to the processor and therefore display live footage on the screens. The apparatus also provides for interactivity. By allowing an individual to interact with images projected onto the screen, the apparatus can be used for a wide variety of training purposes. The apparatus may form an advanced home entertainment suite.

BRIEF DESCRIPTION OF THE DRAWINGS

In the drawings, which by way of example illustrate an embodiment of the invention.

DETAILED DESCRIPTION OF THE DRAWINGS

Figure 1:
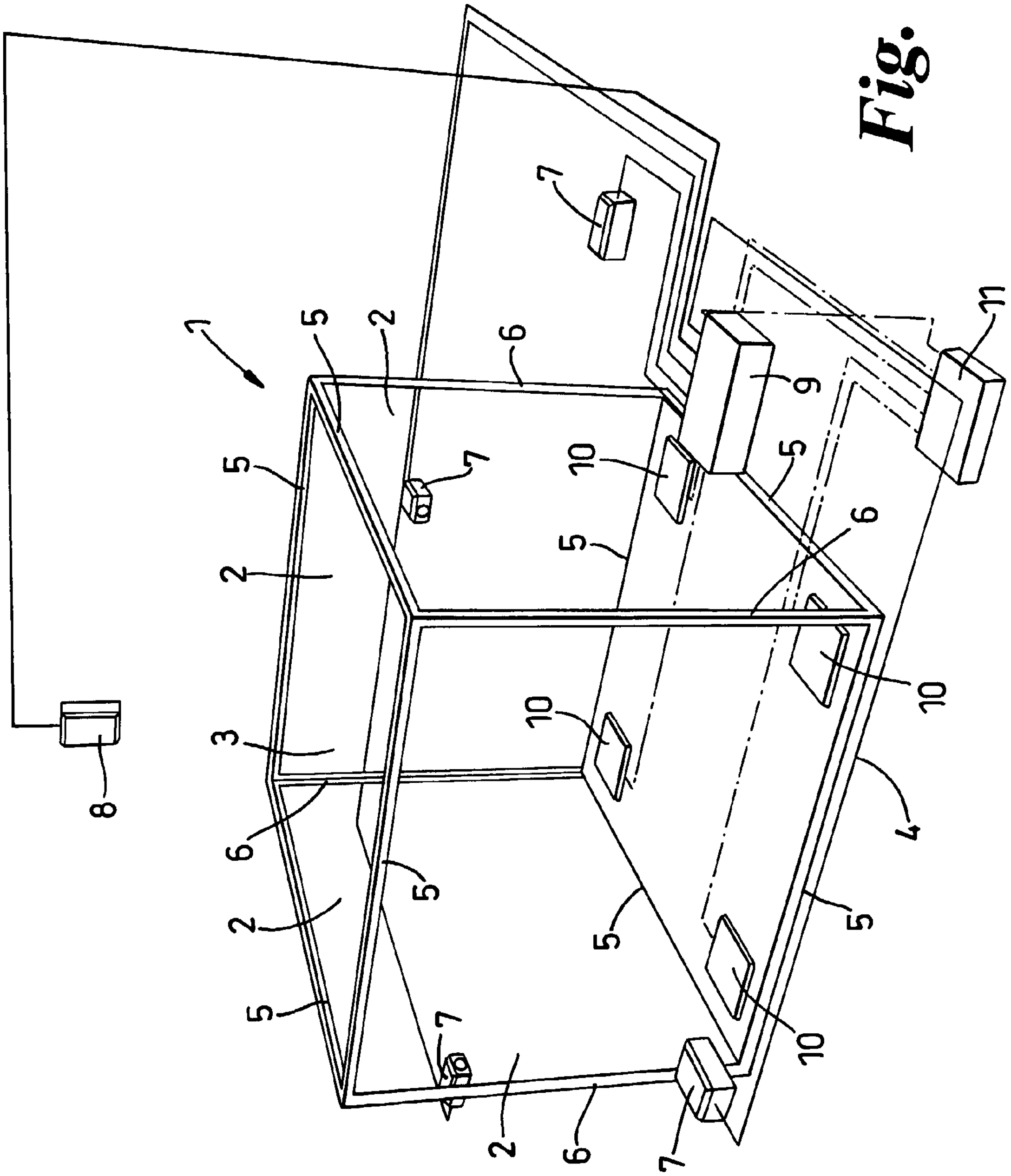
FIG. 1 is a schematic representation of a structure into which images are projected.

Referring now to FIG. 1, there is shown apparatus including an enclosure 1 comprising four projection screens 2 forming the walls of the enclosure 1, a fifth projection screen 3 constituting the enclosure's ceiling, and a floor 4. Each projection screen 2 is attached to horizontal and vertical frame members 5, 6. The projection screen 3 is attached to the upper horizontal frame member 5, whilst the floor 4 is attached to the lower horizontal frame members 5. The result is a completely enclosed space. At least one of the screens 2 is either moveable or includes a closable access, thereby permitting a person to enter the enclosure 1.

In this example, four video projectors 7 are arranged outside the enclosure 1 and are aligned to project images onto the screens 2. A fifth video projector 8 is located above the screen 3 and is aligned to project images onto the screen 3. Each projector 7, 8 projects an image onto one of the screens 2, 3, respective projected images each filling one of the screens 2, 3.

As an alternative, the screens 2, 3 and projectors 7, 8 may both be replaced by flat panel display or screen technology, such as plasma or LCD screens.

The projection of images onto the screens 2, 3 is controlled by one or more processors (in the example one processor 9), which process the video and audio streams.

The floor 4 of the room 1 includes loud speakers 10, one in each corner of the floor 4. The delivery of sound to the loudspeakers 10 is controlled by the processor 9, and is fed through an amplifier 11 to ensure adequate loudness within the room 1.

The processor 9 synchronizes the transmission of images to the projectors 7, 8. In one method of synchronization the processor identifies time stamps in the frames of recorded data. If the images projected by one of the projectors is more than $1/100^{th}$ second out of synchronization with the images projected from the other projectors, the processor executes a synchronization routine (in this case image frames are transmitted at $1/100^{th}$ second intervals. If image frames are transmitted at different intervals, such as $1/50^{th}$ second intervals, then the processor is arranged to execute its synchronization routine if the transmission of images by one of the projectors is out by more than the transmission rate, of in the latter case $1/50^{th}$ second). This is important, since poor synchronization leads to a person in the enclosure 1 losing his point of reference. Rather than using the processor 9 to perform the synchronization of images projected onto the screens, the image data may be fed to the processor and hence the projectors in a synchronous stream.

Another function of the processor 9 is to synchronize the transmission of images via the projectors with the transmission of sound via the amplifier 11 and loudspeakers 10. The processor is adapted to control the transmission of sound, and the loudness of that sound to any one of the speakers 10. This serves two purposes. First, sound can be properly associated with the images projected on the screens 2, 3, for example where the image is of a vehicle the sound and loudness of that sound from any of the speakers 10 changes so that the sound appears to emanate from the vehicle, where-ever it is on the screens 2, 3. Second, where interactivity is provided (described in greater detail below), the processor 9 can direct sound at a desired loudness to one or more of the screens on which images are projected as a result of an interactive act.

Figure 2:
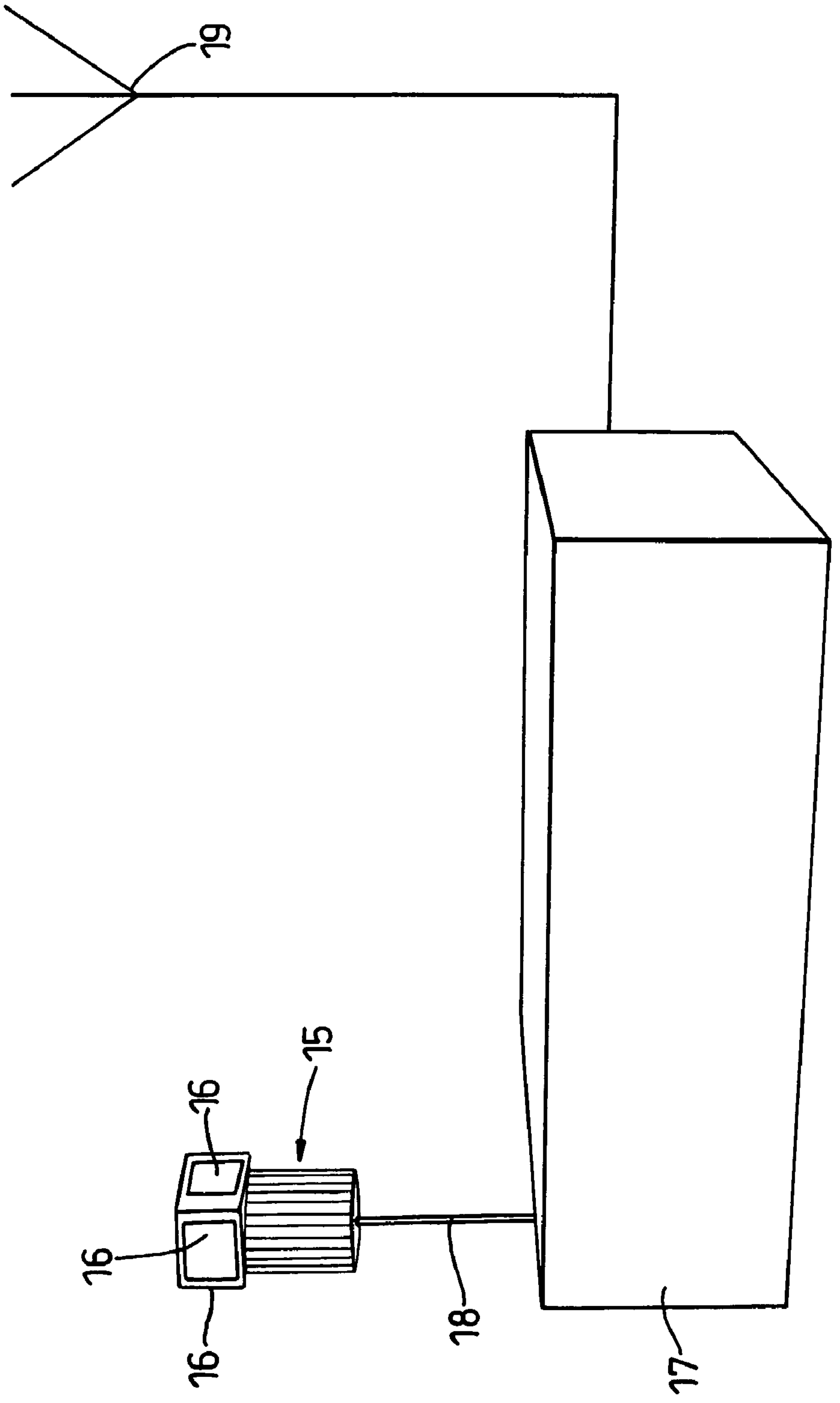
FIG. 2 is a schematic illustration of a camera used in the generation of images for projection into the structure illustrated in FIG. 1.

FIG. 2 illustrates a digital camera 15 comprising four camera heads 16 (two heads being fully visible in FIG. 2). Digital signals from the camera heads 16 are transmitted to a digital video recorder 17 by connection 18. The digital video recorder 17 may retransmit the recorded signals via a transmission antenna 19. Each camera head 16 includes a lens, and a digital video processor. A compression unit may also be included, but is not essential. Signals produced by the digital video processors may be transmitted to the digital video recorder either by cable, or a radio signal. Where transmission is by a radio signal, the camera is provided with a common processor that receives output signals from the digital video processors. The common processor converts the digital video signals into a radio signal and transmits this to the video recorder 17. Where a cable is used, a common processor is not required, the digital video signals being transmitted directly from the digital video processors to the video recorder.

The system provides one immersive image extending 360 degrees around the screens 2. To achieve this, the field of view of each camera head 16 must be at least 90 degrees (the lens shooting footage for the ceiling screen needs to shoot at not less than 121 degrees). The desired image can be achieved either by matching the image taken by the camera to the shape of the screen 2 on to which it is to be projected, or by processing the images to fit the screens. In order to remove aberrations and distortions advanced image processing techniques may be employed such as correction for alignment distortions, perspective distortions, pincushion distortions, barrel distortions. Whereas one camera may be employed for each screen, equally a number of cameras may be employed to capture the scene to be projected onto any one screen, with the images from each camera being stitched together to provide an apparently seamless image for projection onto a screen.

The images projected onto the screens may be interactive. To provide for interactivity, it is necessary to include in the apparatus certain input devices, such as gyroscopic sensors, touch sensitive screens, movement sensors for sensing movement of people within the enclosure[, and holographic screens].

The provision of interactivity is of considerable benefit where the apparatus is to be used in training individuals. The apparatus could be used for training individuals in practices bearing significant risk. For example for training individuals in the use of a control room a recording of a control room could be made, and the controls could be made interactive, so that if a control is depressed there is a reaction on the screen, i.e. another image is caused to be projected on the one of the screens.

Figure 3A:
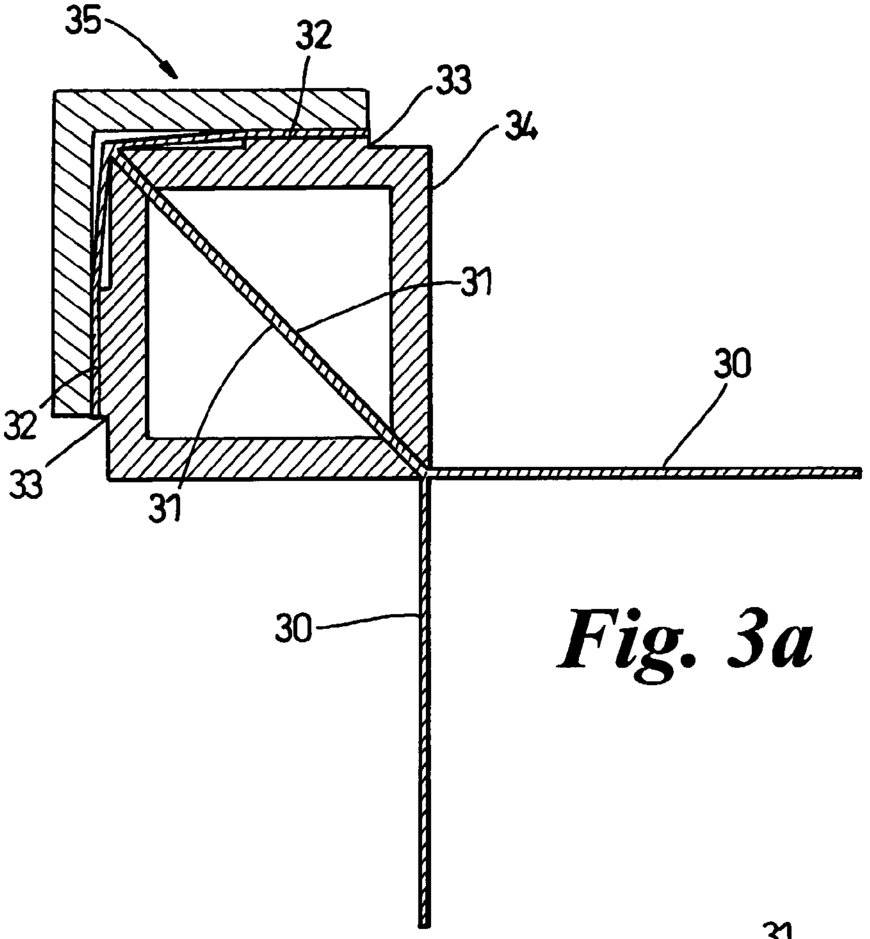
FIG. 3*a* is a cross-sectional plan view of apparatus for attaching screen material to a frame.
Figure 3B:
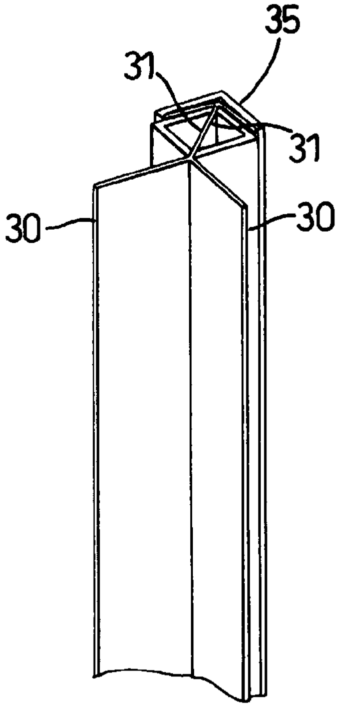
FIG. 3*b* is a schematic illustration of the apparatus illustrated in FIG. 3*a;*

FIGS. 3*a* and 3*b* illustrate apparatus for attaching a soft screen material 30 to a frame 34. The frame 34 consists of two substantially identical elements, each triangular in cross-section. Each frame element is provided with one part of a hook and claw fastener. The screen material 30 of two adjacent sides of a room 1 (see FIG. 1) pass between the two triangular elements 33.

The end portions 32 of the screen material 30 are provided with a corresponding part of the hook and claw fastener. As can be seen from FIG. 3*a*, the end portions 32 extend around the triangular elements of the frame. The corresponding parts of the hook and claw fastener join the screen material 30 to the frame 34. The screen material 30 is secured in place on the frame by means of a clamp 35. The hook and claw fasteners may be replaced by other fasteners such as press-studs, double sided tape, etc.

The apparatus illustrated in FIGS. 3*a* and 3*b* serves two functions. First, the apparatus ensures that the screen material is held taught, and second that there is no part of the frame exposed where adjacent walls meet.

The screens shown in the Figures are soft screens and hard screens on to which images are projected. However, the screens may employ any flat screen technology, including technologies which do not require projection. Plasma screens may be used. Holographic screens may also be used. A holographic screen would allow images to be seen from the inside, but also allow people on the outside to see in.

Front projection techniques may be used in addition to, or in replacement of rear projection techniques.

Whilst the shape of the apparatus in FIG. 1 is rectangular, the shape could equally be substantially spherical, elliptical, pyramid like, a tunnel, etc see FIG. 4.

Any live video footage is preferably shot in a format allowing cropping and stitching. This is required to fit the video footage into other footage and look real. The software is programmed to carryout post production of the captured images.

Images on video recorded footage can have 3d graphics overlaid.

Figure 4A:
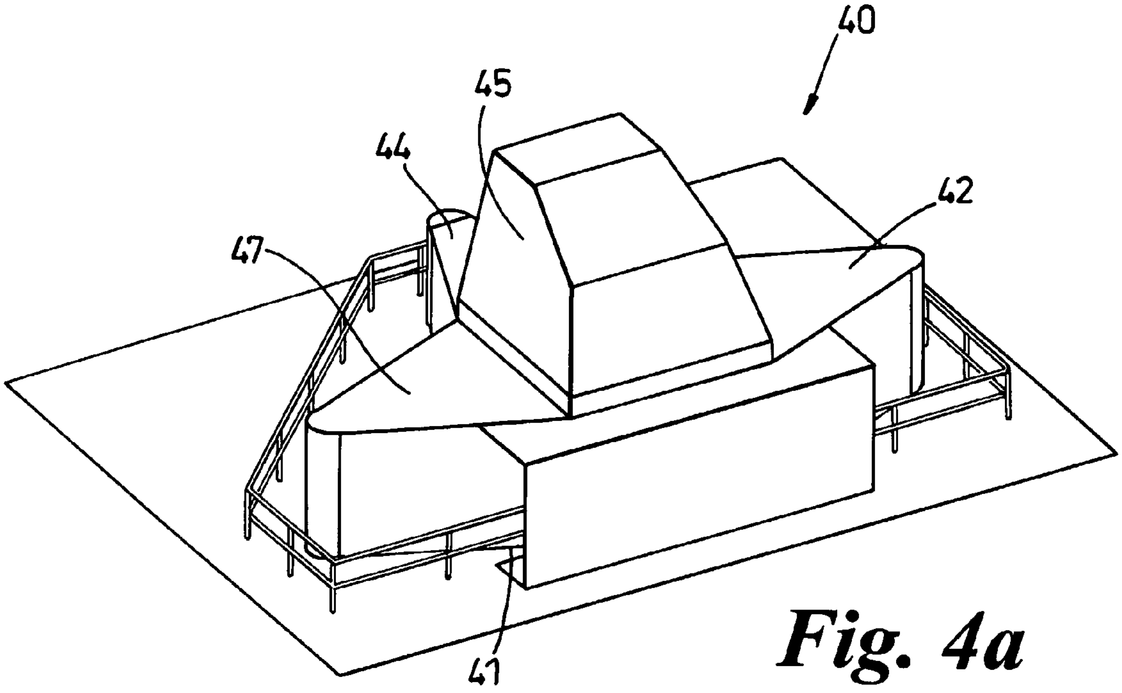
FIG. 4*a* is a schematic illustrates of a surround vision entertainment structure.
Figure 4B:
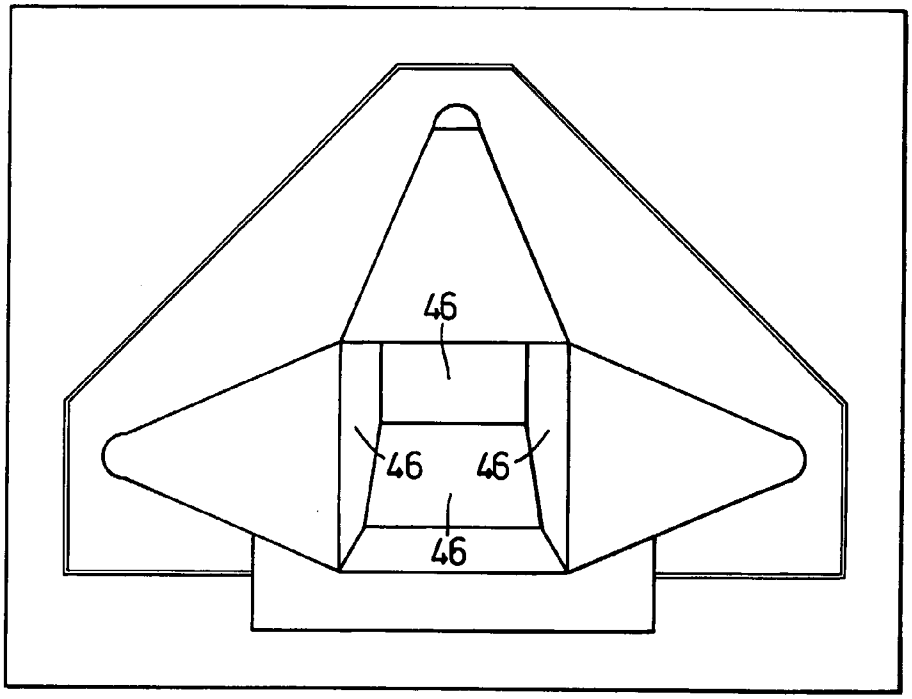
FIG. 4*b* is a front view of the entertainment structure illustrated in FIG. 4*a;*

Referring now to FIGS. 4*a* and 4*b*, an entertainment structure 40 includes an entrance 41 and four chambers 42 to 45. The chamber 45 is located centrally in the structure 40, with wedge shaped chambers 43, 43 and 44 extending radially from the central chamber. Each of the chambers includes a plurality of walls 46, each comprising a screen onto which images are projected. The screens may be of the type illustrated in FIGS. 3*a* and 3*b*, or they may be of the type illustrated in FIGS. 5*a* and 5*b*. One or more of the chambers 42 to 45 are provided with a sound system of the type described with reference to FIG. 1.

In use, people enter the chamber 40 through the entrance 41 and are immersed in images projected onto the screens 46, and sound from the sound system.

Figure 5A:
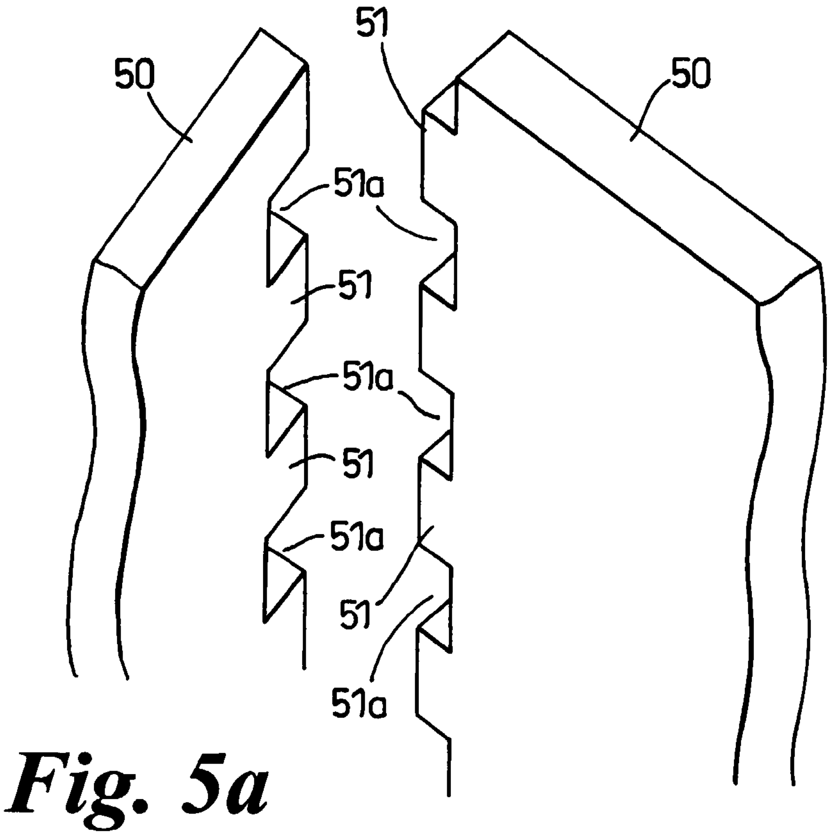
FIG. 5*a* is a schematic representation of apparatus according to the invention showing the connection of adjacent hard screens.
Figure 5B:
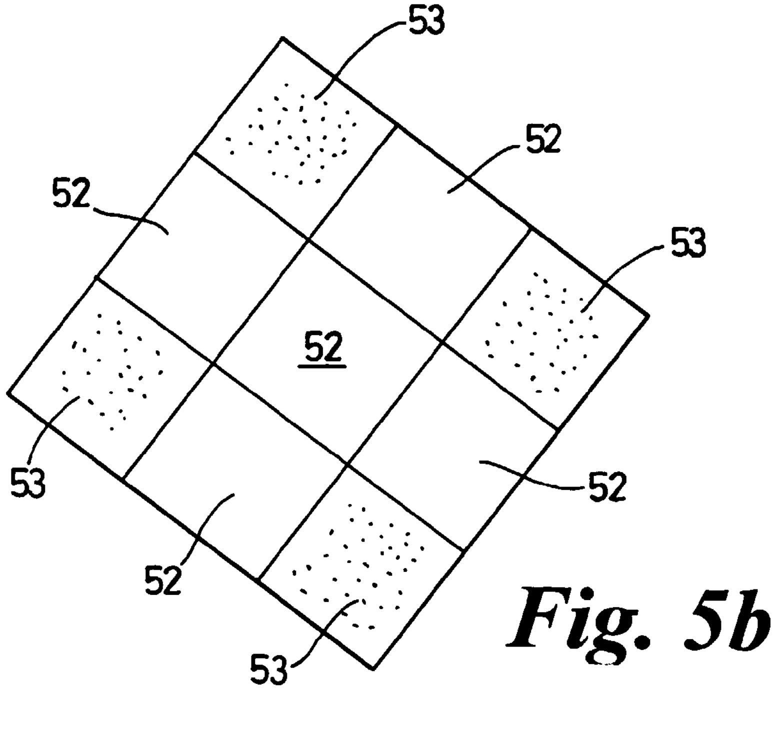
FIG. 5*b* is a schematic representation of the floor of the apparatus illustrated in FIG. 5*a*.

Whereas FIGS. 3*a* and 3*b* illustrate a frame structure for mounting a soft screen, FIGS. 5*a* and 5*b* illustrate screens formed from a hard material, which are self supporting (however, where the screens are particularly large a frame may be used to provide additional support). Each screen 50 is provided with casdeations 51, 51*a* which interlock to join two adjacent screens together. Using casdeations 51, 51*a* to join adjacent screens provides two advantages. First, the type of joint forms a particularly secure connection of one screen to another. Second, when two screens are joined together, the join is not visible, and therefore the joint does not distort image projected on to the screens. The hard screens may be formed as lenses.

FIG. 5*b* illustrates a floor comprising tiles 52 of hard screen material, and speakers 53. By providing tiles 52 images can be projected onto the floor of a chamber of the type illustrated in FIGS. 4*a* and 4*b*, thereby fully immersing an individual in the chamber in images projected onto the screens. It may be desirable to move the speakers out of the floor where the floor provides a screen. As mentioned above in relation to the screens forming walls, any flat panel technology may be employed. Also, images may be projected from the front or the rear onto the screen. In one particularly advantageous embodiment, each tile 52 is a flat panel display (for example and LCD display) with image data being communicated to each of the tiles.

The apparatus may include a games console, which may provide for the playing of interactive video games. The processor 9 may include or consist of a customs games processor. Alternatively, video games may be modified to run on a number of consoles or pc's so that a different view of a game may be displayed on each wall of an enclosure.

In another embodiment of the invention, a plurality of enclosures of the type described with reference to the drawings could be networked together. By using broadband to network the enclosures, the enclosures could be in different locations. This facility could be useful in training exercises, or in multi-player games, where a provision for participants/players to interact with each other provides an enhanced participation experience.

In another embodiment of the invention the source of media may be image media which has not been captured specifically to be displayed using the apparatus of the invention. The image media may be film or video footage. For example, the images may be from one or more cameras at a sports event, which cameras are used to capture images for transmission to television viewers. The present invention allows such images, after processing, to be displayed using the apparatus of the invention. The media is processed using video and audio processing techniques to allow two-dimensional image data to be used in the apparatus of the invention.

The invention claimed is:

1. A surround vision apparatus comprising:
- at least two screens,
- at least one loud speaker,
- a plurality of projectors, and
- at least one processor, wherein
- the at least two screens substantially enclose a space,
- the plurality of projectors project images onto the said at least two screens such that the said images may be viewed from within the said substantially enclosed space,
- the processor synchronises the projection of images onto each screen such that the images are perceived by the viewer as being uninterrupted,
- adjacent screens join at a vertex and wherein the joints are substantially seamless,
- each screen is attached to a frame by fastening means that comprises a flexible end portion of each screen, which end portion in use extends over the frame and is attached thereto,
- wherein the fastening means includes a clamping member which, in use, clamps the flexible end portion of the screen to an outer part of the frame.

2. A surround vision apparatus according to claim 1, wherein the at least two screens include at least one flat panel display.

3. A surround vision apparatus according to claim 1, wherein the said substantially enclosed space is bound by walls, each wall comprising a screen.

4. A surround vision apparatus according to claim 3, wherein the enclosed space is further bound by a ceiling and a floor.

5. A surround vision apparatus according to claim 3, wherein the ceiling and/or the floor include a screen.

6. A surround vision apparatus according to claim 1, further comprising at least one loud speaker.

7. A surround vision apparatus according to claim 6, wherein the processor synchronises sound output with the projection of images onto the or each screen.

8. A surround vision apparatus according to claim 1, wherein the said end portion is attached to the frame by hook and claw fasteners, one element of the hook and claw fastener being attached to the frame and one clement to the said end portion.

9. A surround vision apparatus according to claim 1, wherein each screen is a soft screen or a hard screen.

10. A surround vision apparatus according to claim 1, wherein the said projectors are mounted on the said walls.

11. A surround vision apparatus according to claim 1, further comprising at least one camera adapted to capture images for projection onto the or each screen of the apparatus by said plurality of projectors.

12. A surround vision apparatus according to claim 11, wherein the at least one camera includes a camera head having a field of view, and wherein the field of view encompasses the area of screen onto which the captured images are to be displayed.

13. A surround vision apparatus according to claim 11, wherein the camera includes a camera head, and the field of view of each camera head is at least 90 degrees.

14. A surround vision apparatus according to claim 11, wherein the field of view of at least one of the cameras is at least 121 degrees.

15. A surround vision apparatus according to claim 11, wherein the said camera is linked to the processor for communication therebetween, and wherein the images captured by the camera are selectively projectable onto at least one of the said at least two screens.

16. A surround vision apparatus according to claim 1, wherein the said images are computer generated or video images.

17. A surround vision apparatus according to claim 1, wherein a video image may be overlaid by a computer generated image, or wherein a computer generated image may be overlaid by a video image.

* * * * *